Oct. 12, 1971  W. G. SHICK  3,611,722
LIQUID FLUORINE INJECTOR DESIGN
Filed May 10, 1967
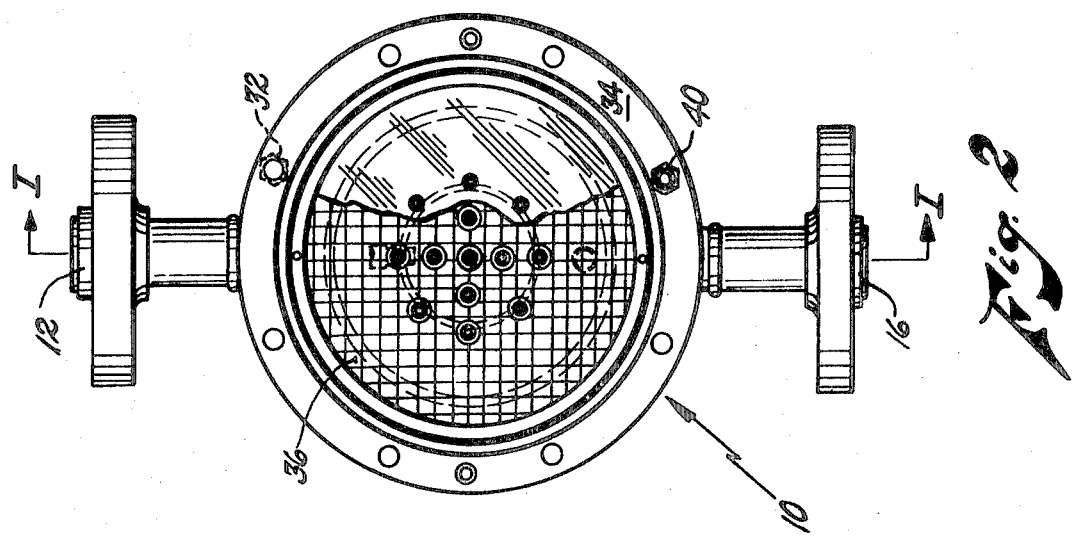
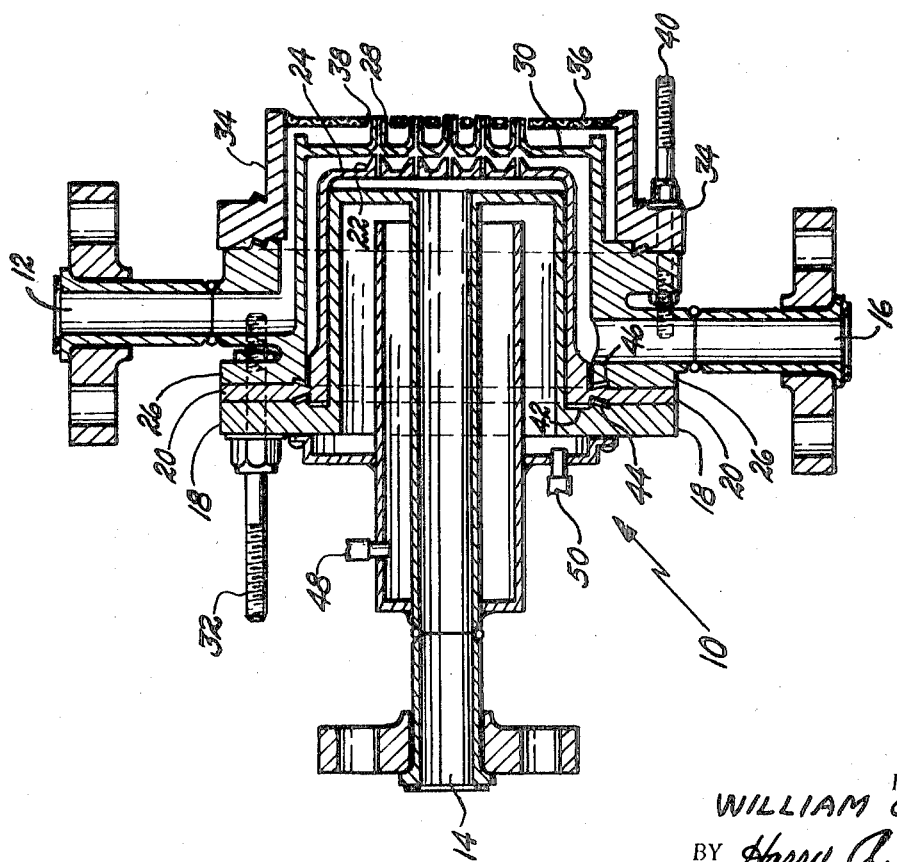
INVENTOR.
WILLIAM G. SHICK
BY Harry A. Herbert Jr
Arsen Tashjian
ATTORNEYS 3,611,722
LIQUID FLUORINE INJECTOR DESIGN
William G. Shick, Lake Park, Fla., assignor to the United States of America as represented by the Secretary of the Air Force
Filed May 10, 1967, Ser. No. 638,700
Int. Cl. F02g 1/00
U.S. Cl. 60—39.74 A   3 Claims

ABSTRACT OF THE DISCLOSURE

A liquid fluorine injector design which can be readily assembled and disassembled into its four separate elements which include a fuel injector plate, an oxidizer secondary injector spudplate, an oxidizer primary injector spudplate, and an injector backplate. The four separate elements are concentrically positioned so that fuel and oxidizer are injected in a highly efficient manner while still providing for easy disassembly to allow visual inspection of all surfaces exposed to the oxidizer material.

---

This invention relates generally to injector assemblies and, more particularly, to injector assemblies which can be completely disassembled mechanically to allow visual inspection of surfaces which come in contact with an oxidizer.

Previously manufactured fuel and oxidizer injector assemblies have required the utilization of auxiliary equipment in order to analyze the effects of the oxidizer, for example, liquid fluorine, on the material of which the injector is fabricated. This type of inspection procedure produced delays in effective utilization of engines in which they are assembled and resulted in many premature failures of engines because of the corrosive effect of the oxidizer on injector parts not capable of inspection by ordinary maintenance procedures.

This invention contemplates the provision of various elements which can be assembled by the use of easily removable bolts such that, upon disassembly, all of the surfaces which are in contact with liquid fluorine would be easily inspected visually.

Accordingly, it is a primary object of this invention to provide an injector assembly which allows visual inspection of surfaces exposed to oxidizing materials when the injector is disassembled mechanically.

It is another object of this invention to provide an injector assembly, the design of which reduces liquid fluorine burnout problems, with hot firings.

It is still another object of this invention to provide an injector which is easily disassembled for cleaning, maintenance and passivation of the injectors.

It is a further object of this invention to provide an injector assembly which is easily manufactured of conventional, currently available materials that lend themselves to standard mass production manufacturing techniques.

These and other advantages, features and objects of the invention will become more apparent from the following description taken in connection with the illustrative embodiments in the accompanying drawings, wherein:

FIG. 1 is a cross section of the injector assembly of this invention taken along lines I—I of FIG. 2; and FIG. 2 is an end view partially cut away of the faceplate of the injector assembly from the combustion chamber.

Referring in detail to the figures, there is shown generally an injector assembly 10 which has a fuel inlet at 12 and a pair of oxidizer inlets. The primary oxidizer inlet is indicated at 14 while the secondary oxidizer inlet is illustrated at 16. The fluorine oxidizer comes into contact with the passageways through which it is directed for presentation in a concentric manner to the fuel, which in this case, would be gaseous hydrogen for combustion in a conventional combustion chamber (not shown). The first section which forms a part of the liquid fluorine injector called the injector backplate is indicated by the numeral 18 and is combined with a second section 20 called the oxidizer primary injector spudplate to form a passageway to a set of primary orifices 22 in the primary oxidizer spudplate portion 24. A third element 26 called the oxidizer secondary injector spudplate forms a part of the fuel inlet 12 and together with element 20 forms the passageway for liquid fluorine from the second oxidizer inlet 16 which is also formed as a part of element 26. Egress of the secondary oxidizer is provided by means of secondary orifices 28 formed in the spudplate portion 30 of the injector assembly element 26. The three elements 18, 20 and 26 which are combined to form the liquid fluorine passageway portions of the injector assembly 10 are bolted together in a conventional manner as indicated at threaded member 32.

A series of bolts 32 are provided adjacent the outer circumference of the assembly of the elements 18, 20 and 26. The hydrogen fuel inlet 12 also leads to the combustion chamber through a passageway which is formed between element 34 called a fuel injector plate and element 26. Element 34 has a rigid mesh faceplate 36 which has annular orifices 38 for communicating the combustion chamber with the passageway between elements 26 and 34. A series of bolts 40 are provided for attachment of element 34 to 26. Stainless steel angle gaskets are provided at 42, 44 and 46 to prevent leakage of the liquid fluorine oxidant. If cooling is desired, element 18 could be shaped to provide a coolant passageway having an inlet at 48 and an outlet at 50 through which liquid nitrogen coolant would flow.

In operation, fuel is supplied through the inlet 12 in the oxidizer secondary injector spudplate 26 to the cavity behind the fuel injector plate 34 and is injected through the annular orifices 38 formed by the outside diameter of the secondary oxidizer spuds 28 and a circular hole in the faceplate 36. The faceplate 36 is constructed of a rigid mesh material, called Rigimesh, which fits into the combustion chamber and is transpiration cooled by a portion (approximately 10%) of the fuel, such as gaseous hydrogen. Fluorine to the spuds 28 on the secondary injector spudplate 30 enters through the inlet 16 in the oxidizer secondary plate 26. The oxidizer primary injector inlet 14 is in the backplate 18. The injector parts are assembled so that the oxidizer primary and secondary injector spuds are concentric with the holes in the Rigimesh faceplate 36.

At a high flowrate during high thrust level operation, where the injector pressure drop is high, almost all of the flow is programmed through the large injection area secondary passages 28. As the total flowrate is reduced, the primary-to-secondary flow ratio is increased until at minimum flow level all or almost all the flow is programmed through the small injection area primary passages 22.

Thus, the four main elements of the injector design include the fuel injector plate 34, the oxidizer secondary injector spudplate 26, the oxidizer primary injector spudplate 20, and the injector backplate 18. From the foregoing, it can be seen that upon disassembly of the bolt and nut arrangements 32 and 40, the passageways between elements 18 and 20 and 20 and 26, as well as all of the nozzle portions 22, 28 and 38, can be visually inspected quickly and easily without the utilization of expensive auxiliary equipment. Also, upon disassembly, the present design allows easy and complete passivation of the components which are to be used with liquid fluorine by exposing the components to fluorine gas to remove contaminants and to form a fluoride coating which serves to protect the metal from further fluorine attack. The components are exposed to slowly increasing densities of fluorine so that slow reactive cleaning occurs.

Although the invention has been described with reference to a particular embodiment, it will be understood to those skilled in the art that the invention is capable of a variety of alternative embodiments within the spirit and scope of the appended claims.

I claim:

1. A liquid fluorine injector assembly for delivering fuel/oxidizer to the combustion chamber of a bipropellant rocket engine, said injector comprising a fuel injector plate section having a plurality of circular openings on the face thereof, an oxidizer secondary injector spudplate section positioned parallel to said fuel injector plate, an oxidizer primary injector spudplate section positioned parallel to said oxidizer secondary injector spudplate section, an injector backplate positioned parallel to said oxidizer primary injector spudplate, the face portion of each of said sections being in spaced relation to the next adjacent section, said injector backplate and said oxidizer primary injector backplate being provided with flanges having a plurality of mutually aligned openings therein alignable with corresponding openings in the flange on said oxidizer secondary injector spudplate section, said fuel injector plate section being provided with a flange having a plurality of openings therein alignable with a second flange on said oxidizer secondary injector spudplate section, a series of elongated threaded members for insertion through the aligned openings in the flanges of the injector sections, a corresponding series of nut members attachable to said threaded members for retaining the injector sections in fixed relative positions with each other, the removal of said nut members allowing ready disassembly of said injector sections for cleaning and inspection after operation.

2. The liquid fluorine injector assembly defined in claim 1 wherein the face portion of the fuel injector plate section includes a Rigimesh faceplate constructed of a rigid mesh material allowing passage of a portion of the fuel supply therethrough into the engine combustion chamber to provide transpiration cooling of the faceplate and prevent damage thereto.

3. The liquid fluorine injector assembly defined in claim 1 wherein a primary oxidizer inlet is disposed in the oxidizer primary injector section, the primary oxidizer being injected through spuds in the primary oxidizer spudplate, a secondary oxidizer inlet is disposed in the oxidizer secondary injector section for supplying secondary oxidizer for injection through the spuds in the oxidizer secondary injector spudplate, a fuel inlet disposed in said oxidizer secondary injector section for delivering fuel to the area between the oxidizer secondary injector spudplate and the fuel injector plate, the fuel being injected into the engine combustion chamber by passage through an orifice in said fuel injector plate.

References Cited

UNITED STATES PATENTS

| | | | |
|---|---|---|---|
| 2,874,539 | 2/1959 | Fox | 60—39.48 |
| 3,085,394 | 4/1963 | Handley | 60—39.74 |
| 3,136,123 | 6/1964 | Stein | 60—39.48 |
| 3,170,286 | 2/1965 | Stein | 60—39.46 |

SAMUEL FEINBERG, Primary Examiner

U.S. Cl. X.R.

239—425